Oct. 14, 1958 C. E. POYNTER 2,855,656
EXTERNAL OR SURFACE BROACHING MACHINES AND TOOLS THEREFOR
Filed March 26, 1957 2 Sheets-Sheet 1

INVENTOR
CYRIL E. POYNTER

Oct. 14, 1958 C. E. POYNTER 2,855,656
EXTERNAL OR SURFACE BROACHING MACHINES AND TOOLS THEREFOR
Filed March 26, 1957 2 Sheets-Sheet 2
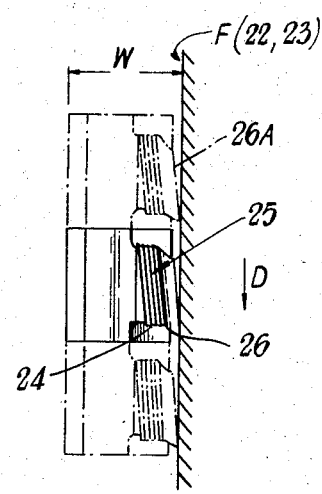
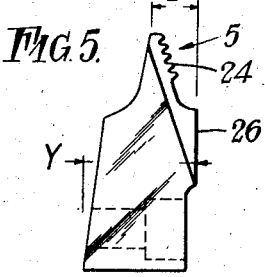
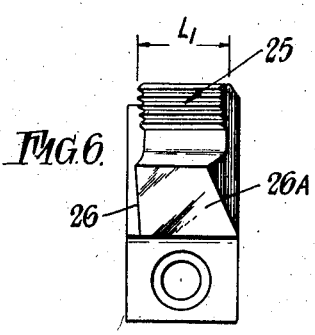
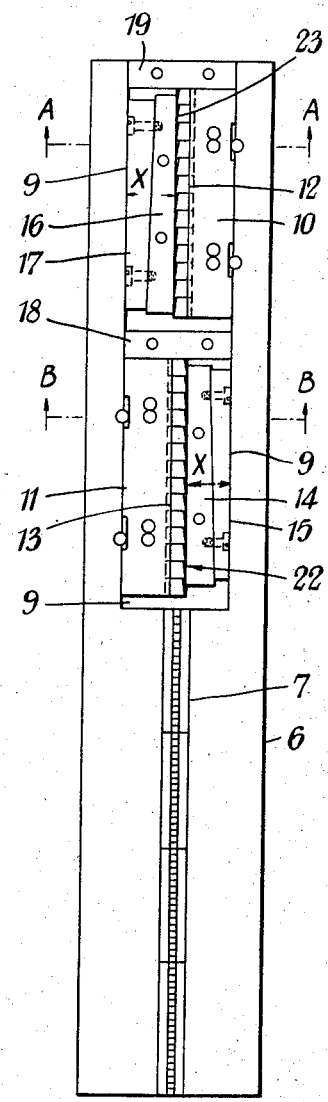
INVENTOR
CYRIL E. POYNTER

United States Patent Office 2,855,656
Patented Oct. 14, 1958

2,855,656

EXTERNAL OR SURFACE BROACHING MACHINES AND TOOLS THEREFOR

Cyril Edward Poynter, Biggleswade, England, assignor to Weatherley Oilgear Limited, Biggleswade, England Application March 26, 1957, Serial No. 648,636

Claims priority, application Great Britain June 7, 1956

4 Claims. (Cl. 29—95.1)

This invention relates to external or surface broaching machines and especially, the broaches and broach holders used for this type of broaching machine.

The invention is capable of general application, and the broaches can be of the solid type (cutters solid with the broach) or the cutters can be inserts fitted to a broach-holding bar. The invention is especially, but not essentially, concerned with the cutting of the so called "fir tree" form slots in the rims of jet engine turbine rotors, and the "fir tree" forms in the roots of turbine blades.

Up to the present time, the two most usual methods of broaching such slots and forms employ either full form relief type broaches arranged to cut the form in a slot or upon a root at one side and then the other side, or solid form generating broaches which cut and develop a "fir tree" form in both sides of a slot simultaneously.

While both methods have been considered satisfactory they both have disadvantages. The fully form relief broaches when assembled as multiple inserted cutters in a holder or sub-bar take skill and time to reset after sharpening the cutting edges.

The fully form relieved type of broach has none the less the important advantage of providing better cutting conditions, and it can maintain precision accuracy of form in the cutting of the work piece. It can be sharpened a large number of times before its useful life is ended.

The solid form generating broaches can be sharpened and returned to the machine quickly, because there is no necessity for the resetting of the broach after sharpening but this type of broach has important disadvantages.

The cutters cannot be designed to cut efficiently, throughout a long life, because to maintain form they cannot be "backed off" (that is to say relieved along their cutting surface). With no "backing off" the thickness of the cutter is "straight landed" (of identical cross-section throughout its thickness) and the "straight land" surface rubs on the work piece. On account of the friction thus created, the thickness of the "straight land" cannot be chosen to provide the maximum cutter life. The maximum practical thickness for precision work of the kind referred to is such, that there is only enough metal in "straight land" thickness to allow a few resharpenings of the cutting edges.

The main object of this invention is to eliminate the disadvantages and retain the advantages of the above methods of broaching.

A further object of the invention is to provide a broach and a suitable holder or bar, the construction of which, permits rapid removal of the broach from the bar, for sharpening and replacement without altering the setting of the cutting edge relative to the work thus reducing idle time in production to a minimum.

From one aspect, the invention provides a broaching tool having at least one cutter whose cutting form is relieved at a definite angle and provided with an alignment face relieved at the same angle as the cutting form, the said alignment face having an edge in the plane of the cutting face of the cutter, whereby removal of material in that plane to sharpen the cutter simultaneously removes material from an end of the alignment face to maintain the said edge thereof at constant distance from the cutting form of the cutter.

This means that the cutting form of a cutter can always be accurately relocated on a broach bar by abutting the edge of the alignment face against a master location face on the bar.

From another aspect the invention provides a broaching machine for external or surface broaching, comprising a broach holding main bar having a master locating face for the accurate location of at least one cutter, the said cutter having its cutting form relieved at a definite angle and being provided with an alignment face which is relieved at the same angle as the cutting form and which provides an alignment edge in the plane of the cutting face of the cutter, whereby removal of metal in the plane of the cutting face by grinding may simultaneously remove material from the end of the alignment face containing the said alignment edge, so that the cutting form of the cutter is maintained at a constant distance from the alignment edge no matter how many grindings take place and may always be relocated accurately by abutment of the alignment edge against the master locating face on the bar.

Further features of the invention include construction of the broach with multiple inserted renewable cutters, the provision of solid or adjustable blocks to provide the master locating face of the bar, and provision for the automatic registration of the edge or face of the broaches with the master locating face of the holder, during replacement of the broach in the holder.

A preferred form of the invention, applied to broaching "fir tree" slots in turbine rotors is shown in the drawings, in which:

Fig. 5 is an end view of a multiple insert cutter of the fully formed relief type made in accordance with the invention, Fig. 6 is a side view thereof, Fig. 7 is a plan view thereof, Fig. 8 is a front elevation of a broach bar or holder with broaches assembled therein.

Figure 1:
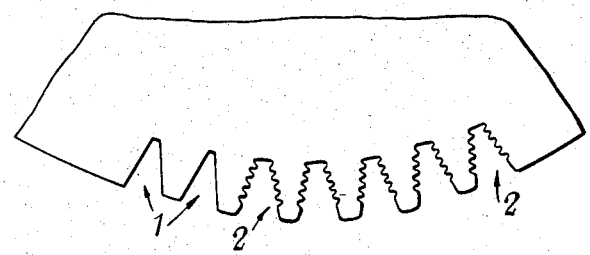
Fig. 1 is a view of part of the rim of a turbine rotor.

Referring to Fig. 1, I have shown part of the rim of a turbine rotor. The rim is roughed gashed at 1 and finished form broached at 2.

Figure 4:
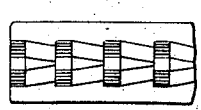
Fig. 4 is a plan thereof.
Figures 2, 3:
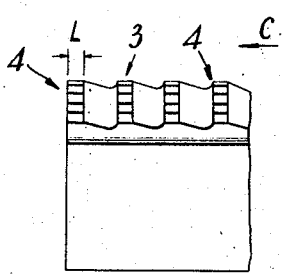
Fig. 2 is an end view of a solid form generating broach of known form.
Fig. 3 is a side view thereof.

As mentioned before, there are two main types of cutters used for the finished form broaching of turbine rotors. The solid form generating type of cutter is shown in Figs. 2, 3 and 4. This type of cutter, cuts both sides of the slot simultaneously. Many cutting teeth 3 are required to cut the roughed slot 1 to the finished form 2, only five teeth are shown in the drawings. The direction of cutting is indicated by arrow C. The "fir tree" form is produced by progressively shaving away, the metal and each cutting edge of a tooth has a slightly different profile from the cutting edges of the adjacent teeth.

Dealing with any one tooth, the thickness or depth of the tooth L, Fig. 3, represents the thickness of metal to withstand the broaching load, plus an amount, to allow the cutting face to be ground for resharpening the cutting edge. When highly accurate slots of this kind are required it is not practical to "back off" the form to avoid friction with the work piece. Any "backing off" would reduce the width and contour of the form, and as the limits allowable for this class of work are very close, the form of the cutting teeth must be the same throughout the thickness L of the tooth.

If the thickness L is greatly increased to allow for a large number of regrinds, the friction in operation is too great, and in practice it has been found that an allowance for about fifteen regrinds is a maximum.

Figure 9:
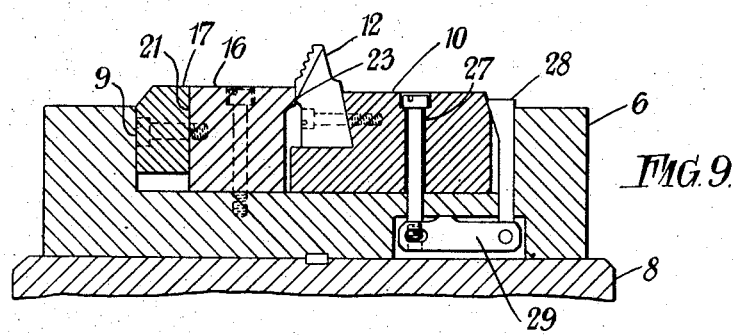
Fig. 9 is a section on the line A, A of Fig. 8.
Figure 10:
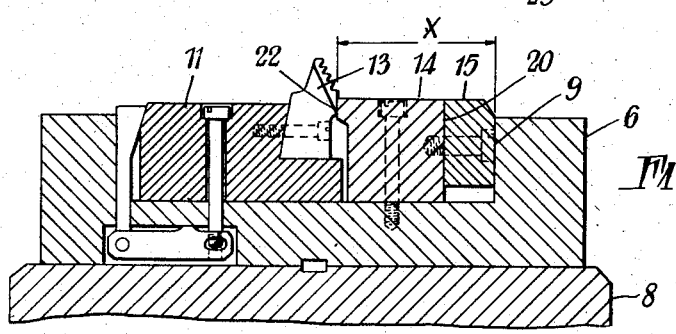
Fig. 10 is a section on the line B, B of Fig. 9.

The other type of cutter, the precision fully form relieved type, modified in accordance with the invention, is shown in Figs. 5, 6 and 7. In this design the thickness can be anything that is desired. $L_1$ in Fig. 6 is the thickness of the tooth and most of this metal is provided for regrinding away when resharpening the cutting edge. It will be noted that the cutting form cuts only one side of the slot 2, Fig. 1. Several such inserted cutters are required to produce the finished "fir tree" form and as shown in Figs. 8, 9 and 10, left and right hand cutters are used. The direction of cutting is indicated by arrow D, Fig. 7. The contour or form is the same through thickness $L_1$ and the cutting face can be ground many more times than that possible with the solid form generating type of broach previously described.

Apart from the advantage of additional cutting life, the cutting conditions are superior in that there is less rubbing or friction with the work piece and as the form is not interfered with, truly precision broaching is possible over long runs on production.

It will be appreciated that each time the face 5 is reground to sharpen the cutting edge, the cutter must be moved to bring it in line with the previously set line of cutting. In the past, these multiple cutters were set in a sub bar and assembling and resetting the cutters to new positions, each time the cutters were sharpened, required longer setting time than can be spared, especially in cases where no spare sets of broaches are available, where high production conditions prevail, and where "down time" is of importance.

I have eliminated the above disadvantages, reduced the skill required in setting, and decreased "down time" to a minimum by a new and novel feature.

Referring to Figs. 8, 9 and 10, the reciprocating slide 8 of the usual hydraulically or mechanically operated broaching machine, has a main bar 6, having a channel containing roughing broaches 7 which broach the V-shaped slots 1 as shown in Fig. 1. The channel is widened at the upper end at 9 to accommodate finishing broach-holding bars 10, and 11 and multiple inserted "fir tree" form cutters 12 and 13. The channel also accommodates adjustable blocks 14, 15 and 16, 17 and thrust blocks 18, 19 which are permanently secured to the main bar 6.

It will be seen that blocks 14, 15 and 16, 17 have taper faces 20 and 21, Figs. 9 and 10. The blocks are slidably adjustable for increasing or decreasing dimension X, Fig. 8. When the blocks are adjusted to suit a given size or design of "fir tree" slot they are secured to the holder 6 by means of holding down bolts, as shown in the drawing, and the faces 22 and 23 become master location faces. These two faces once set for a particular size and design of "fir tree" slot remain unaltered until another width or design of slot has to be broached.

Referring to Fig. 7, this master registration face is indicated by the line F. Three of the multiple inserted fully form relieved cutters are shown, one in full lines and two in dotted lines.

As mentioned previously, when this type of cutter is ground on face 5 to sharpen its cutting edge, it must be moved outwards, towards the walls of the slot, to place it in its previously set alignment for restarting cutting the slots.

It will be seen that, in operation, the machining process can be stopped, the broaches 10 and 11 with insert cutters attached, can be removed from the machine, the cutters can be sharpened and the broaches can be fitted back into the machine without interfering with the previous setting, provided that the broaches are pushed over so that the alignment edges 26 of the cutters make contact with the master registration faces 22 and 23.

One method of pushing the broach across to bring the edges 26 of the cutters into contact with the registration face is shown in Figs. 8, 9 and 10. When the bolts 27 are tightened, the wedge 28 through the pivoted lever 29, pushes the broach into registration with the master location face. The holes in the broach for bolts 27 are elongated and to remove the broach from the holder, the former is moved a small distance downwards, after the bolts have been slacked off.

The multiple inserted cutters 12, 13 are not removed from the broaches 10, 11 for sharpening of the cutting edges. The initial setting of the cutters in the broaches remains permanent and grinding of the faces of the cutters for sharpening the cutting edges is done as if the broach were a solid one piece tool. When the faces 5 of the cutters are ground back by about three quarters of depth $L_1$ they have finished their useful life and are replaced by new cutters.

It will be understood that I have devised a broaching device which has the advantage of quick removal and replacement from the machine without losing the original setting, which requires no removal of the cutters from the broach for sharpening, which gives superior precision cutting conditions because the form is held perfectly accurate and constant during the whole cutting life of the cutters and there is enough thickness of metal in the cutters to allow many more regrinds than now considered possible.

These advantages, particularly the constantly accurate form, during the whole of the broach life, are of paramount importance in the case of broaching "fir tree" forms, as these forms have to be cleanly cut and held to tolerances of .0002" to .0003".

Having now described one form and manner of using my invention, it is understood that many detailed alternative constructions can be devised within the scope of the invention.

For example, the cutters could be solid with the broach and thus be a one piece broach.

Or the master location face 22 could be solid with the main bar 6 making a one piece holder with registration face, or the sliding taper adjustable width registration block 14, 15, could be a one piece solid block without any adjustment.

The automatic push over and tightening down mechanism 27, 28 and 29, could be one involving two separate operations, namely, one using taper wedges or screws for pushing the broach into contact with the registration face 23 and having separate holding down bolts for securing the broach to the holder.

In Fig. 8 I have shown two finished form broaches, one with left hand cutters at the top of the holder and the other with right hand cutters located immediately below. This is a most convenient arrangement but any number of left hand and right hand broaches could be used. They could be grouped with all the left hand broaches at the top of the holder with all the right hand broaches below, as shown, or left and right hand broaches could be staggered along the whole length of the pocket in the holder.

I claim:

1. A broaching tool comprising at least one cutter having a cutting face whose cutting form is relieved at a definite angle, said cutter having an alignment face relieved at the same angle as the cutting form, the said alignment face having an edge in the plane of the cutting face of the cutter, whereby removal of material in that plane to sharpen the cutter simultaneously removes material from an end of the alignment face to maintain the said edge thereof at constant distance from the cutting form of the cutter.

2. A broaching tool for external or surface broaching, comprising a broach holding main bar having a master locating face, at least one cutter mounted on said bar and having a cutting face, a cutting form and an alignment face, said alignment face having an edge in engagement with said master locating face for the accurate location of said cutter, the said cutter having its cutting form relieved at a definite angle and said alignment face being relieved at the same angle as the cutting form and providing said alignment edge in the plane of the cutting face of the cutter, whereby removal of metal in the plane of the cutting face by grinding may simultaneously remove material from the end of the alignment face containing the said alignment edge, so that the cutting form of the cutter is maintained at a constant distance from the alignment edge regardless of the number of grindings and may always be relocated accurately by abutment of the alignment edge against the master locating face on the bar.

3. A broaching tool as claimed in claim 2 wherein the master locating face is formed on a separate block which has taper faces for adjustment purposes.

4. A broaching tool as claimed in claim 2, having means for shifting the alignment edge of a cutter into contact with the master locating face, means for locking the cutter in position, and means connecting said shifting means and said locking means to effect simultaneous operation thereof.

References Cited in the file of this patent

UNITED STATES PATENTS

| | | |
|---|---|---|
| 2,585,832 | Phaneuf | Feb. 12, 1952 |
| 2,697,271 | Phaneuf | Dec. 21, 1954 |
| 2,770,027 | Bonnafe | Nov. 13, 1956 |
| 2,770,028 | Bonnafe | Nov. 13, 1956 |